US008950881B2

(12) United States Patent

Chen et al.

(10) Patent No.: US 8,950,881 B2
(45) Date of Patent: Feb. 10, 2015

(54) BACKLIGHT MODULE AND KEYBOARD

(71) Applicants: Darfon Electronics (Suzhou) Co., Ltd., Suzhou, Jiangsu Province (CN); Darfon Electronics Corp., Taoyuan (CN)

(72) Inventors: Yen-Chang Chen, Taoyuan (TW); Liang-Yu Yao, Taoyuan (TW); Hsin-Cheng Ho, Taoyuan (TW)

(73) Assignees: Darfon Electronics (Suzhou) Co., Ltd., New District, Suzhou, Jiangsu Province (CN); Darfon Electronics Corp., Gueishan, Taoyuan (TW)

( * ) Notice: Subject to any disclaimer, the term of this patent is extended or adjusted under 35 U.S.C. 154(b) by 0 days.

(21) Appl. No.: 14/029,811

(22) Filed: Sep. 18, 2013

(65) Prior Publication Data

US 2014/0118989 A1 May 1, 2014

(30) Foreign Application Priority Data

Oct. 26, 2012 (TW) ............................ 101220780 U

(51) Int. Cl.
*G01D 11/28* (2006.01)
*H01H 13/83* (2006.01)
*H01H 3/12* (2006.01)

(52) U.S. Cl.
CPC ............... *H01H 13/83* (2013.01); *H01H 3/125* (2013.01); *H01H 2219/06* (2013.01); *H01H 2219/062* (2013.01); *H01H 2219/064* (2013.01)
USPC .................. 362/23.03; 362/23.01; 362/23.09; 362/600; 362/609; 362/85; 200/314

(58) Field of Classification Search
USPC .......... 362/23.01, 23.03, 23.06, 23.09, 23.14, 362/23.16, 600, 606–609, 615, 85; 200/314
See application file for complete search history.

(56) References Cited

U.S. PATENT DOCUMENTS

| | | | | |
|---|---|---|---|---|
| 8,461,467 B2 * | 6/2013 | Hwa | ............................ | 200/5 A |
| 8,658,925 B2 * | 2/2014 | Chen | ............................ | 200/314 |
| 8,803,015 B2 * | 8/2014 | Toh | ............................ | 200/314 |
| 8,820,949 B2 * | 9/2014 | Takeda | ....................... | 362/23.03 |
| 8,835,785 B2 * | 9/2014 | Yamada et al. | ............... | 200/344 |
| 2011/0226595 A1 * | 9/2011 | Arai et al. | ..................... | 200/314 |
| 2013/0121017 A1 * | 5/2013 | Tsai | ............................ | 362/602 |
| 2014/0151205 A1 * | 6/2014 | Chou | ............................ | 200/314 |

* cited by examiner

*Primary Examiner* — Anne Hines
*Assistant Examiner* — Jose M Diaz
(74) *Attorney, Agent, or Firm* — Winston Hsu; Scott Margo

(57) ABSTRACT

A backlight module includes a light guide plate, a light source, a light shielding sheet, a light reflecting sheet and a light shielding member. The light guide plate has a hole formed thereon and the hole has a side wall. The light source is disposed neighboring to the light guide plate and used for emitting light into the light guide plate. The light shielding sheet is disposed on the light guide plate. The light reflecting sheet is disposed below the light guide plate. The light shielding member is disposed in the hole and covers the side wall of the hole, so as to block the light guided by the light guide plate from being emitted out of the hole.

16 Claims, 7 Drawing Sheets

BACKLIGHT MODULE AND KEYBOARD

BACKGROUND OF THE INVENTION

1. Field of the Invention

The invention relates to a backlight module and, more particularly, to a backlight module adapted to a keyboard.

2. Description of the Prior Art

A keyboard, which is the most common input device, can be found in variety of electronic equipments for users to input characters, symbols, numerals and so on. From consumer electronic products to industrial machine tools are all equipped with a keyboard for purpose of operation.

As technology advances, there are many types of keyboards in use. Users pay much more attention to visual effect of keyboard except basic input function while choosing keyboard. So far a light keyboard has been developed. The light keyboard attracts users in visual effect and can be used in darkness. Therefore, the light keyboard becomes more and more competitive.

The light keyboard is usually equipped with a backlight module for emitting light. The backlight module comprises a light guide plate and a light source. The light source is disposed neighboring to the light guide plate and used for emitting light into the light guide plate, such that the light is guided by and emitted out of the light guide plate. In some cases, a hole may be formed on the light guide plate and used for accommodating a pointing stick, a fastening member or the like. Accordingly, in the light keyboard of the prior art, the light emitted by the light source may leak from the hole of the light guide plate easily, so as to cause a light leak phenomenon.

SUMMARY OF THE INVENTION

An objective of the invention is to provide a backlight module capable of preventing a light leak phenomenon, so as to solve the aforesaid problems.

According to an embodiment of the invention, a backlight module comprises a light guide plate, a light source, a light shielding sheet, a light reflecting sheet and a light shielding member. The light guide plate has a hole formed thereon and the hole has a side wall. The light source is disposed neighboring to the light guide plate and used for emitting light into the light guide plate. The light shielding sheet is disposed on the light guide plate. The light reflecting sheet is disposed below the light guide plate. The light shielding member is disposed in the hole and covers the side wall of the hole, so as to block the light guided by the light guide plate from being emitted out of the hole.

Another objective of the invention is to provide a keyboard comprising a baseplate, a plurality of keyswitches and a backlight module. The keyswitches are disposed on the baseplate. The backlight module is disposed below the baseplate. The structure of the backlight module is depicted in the above.

As mentioned in the above, the backlight module of the invention utilizes the light shielding member, which is disposed in the hole, to block the light guided by the light guide plate from being emitted out of the hole, so as to prevent the light leak phenomenon.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
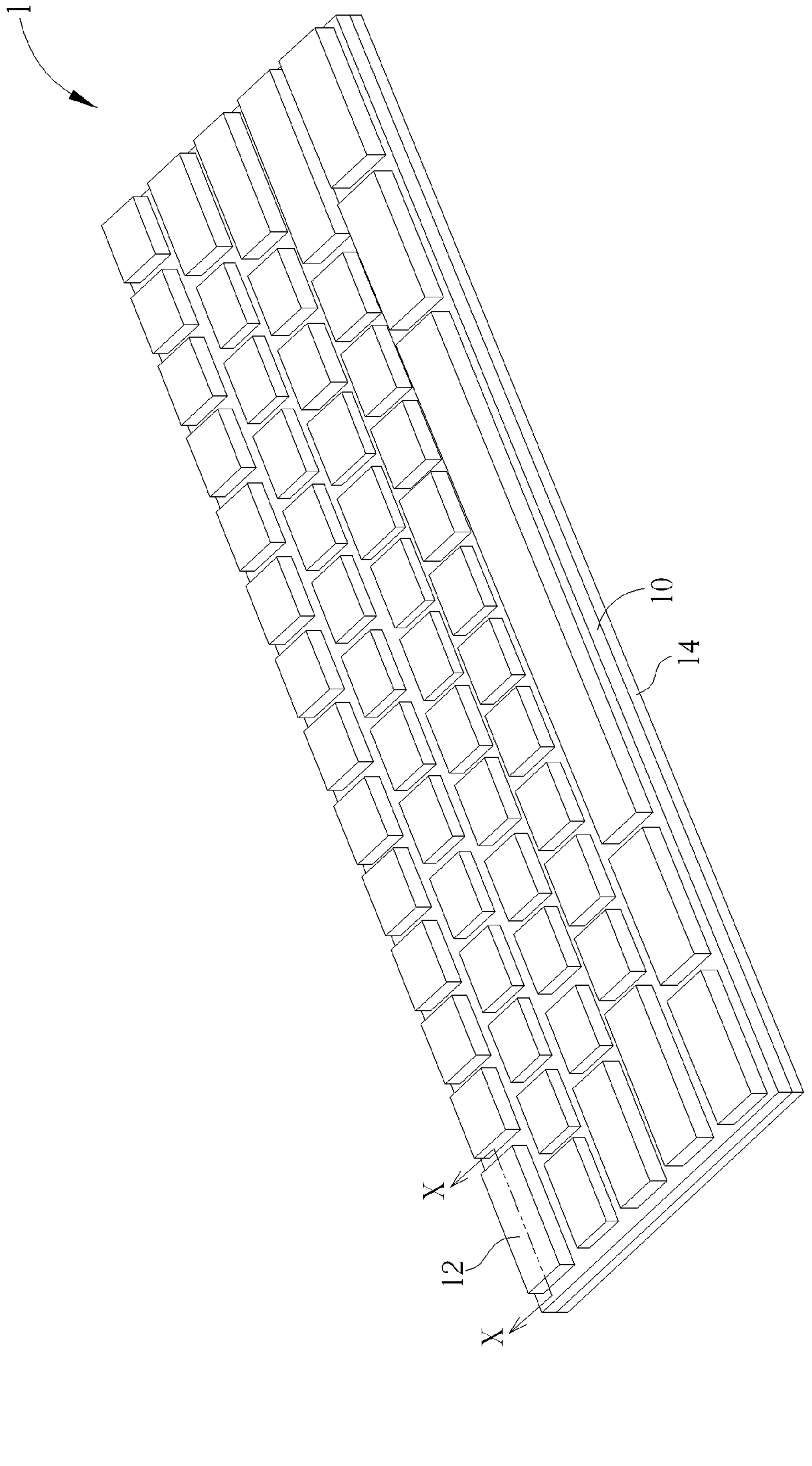
FIG. 1 is a schematic view illustrating a keyboard according to an embodiment of the invention.

Referring to FIG. 1, FIG. 1 is a schematic view illustrating a keyboard 1 according to an embodiment of the invention. As shown in FIG. 1, the keyboard 1 comprises a baseplate 10, a plurality of keyswitches 12 and a backlight module 14. Each of the keyswitches 12 is disposed on the baseplate 10 for a user to press, so as to execute desired function correspondingly. The backlight module 14 is disposed below the baseplate 10 for providing light for the keyboard 1.

Figure 2:
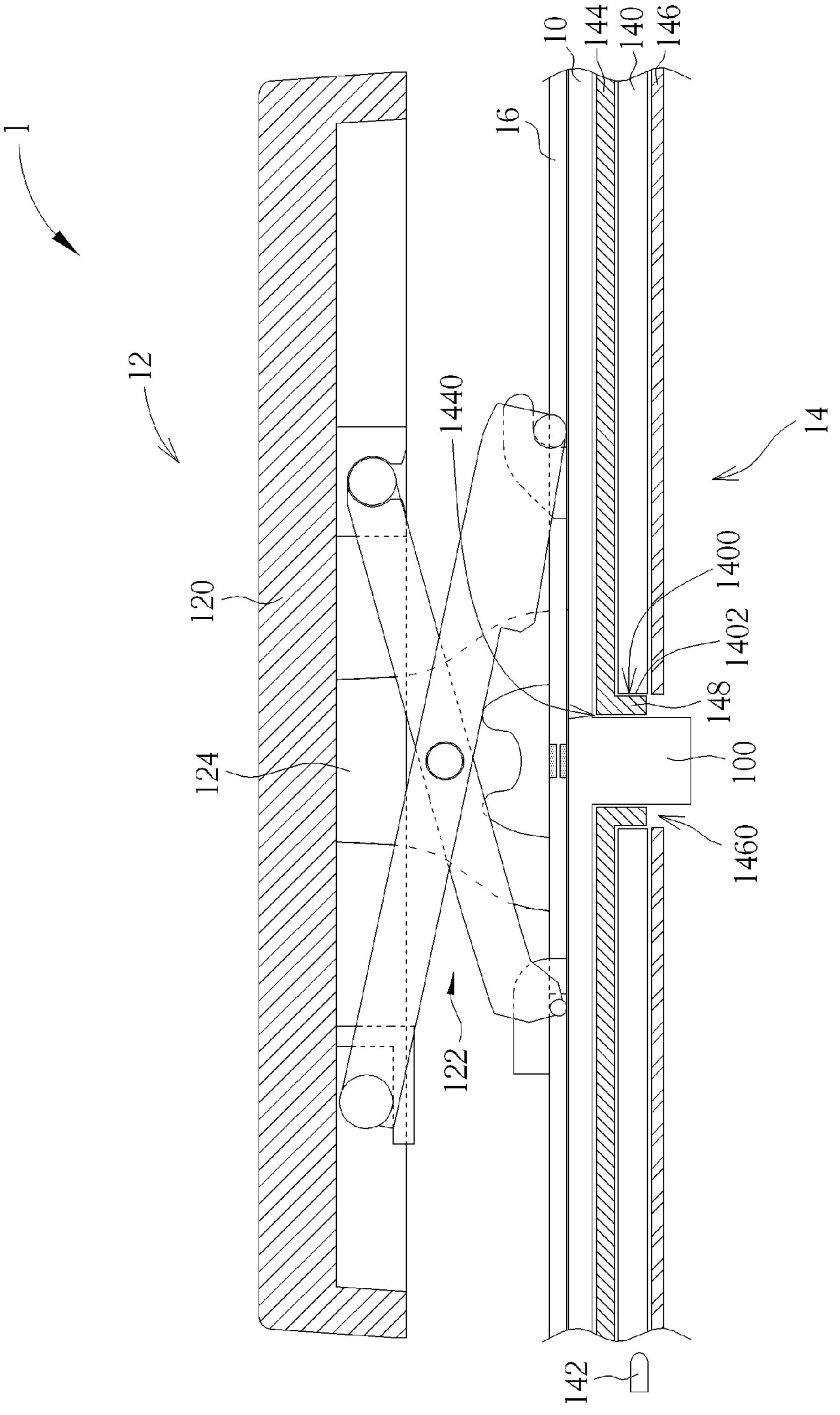
FIG. 2 is a cross-sectional view illustrating the light keyboard along line X-X shown in FIG. 1.

Referring to FIG. 2, FIG. 2 is a cross-sectional view illustrating the keyboard 1 along line X-X shown in FIG. 1. As shown in FIG. 2, the keyboard 1 further comprises a circuit board 16 and the keyswitch 12 comprises a key cap 120, a lift support device 122 and a resilient member 124. The circuit board 16 is disposed on the baseplate 10. The lift support device 122 and the resilient member 124 are disposed between the key cap 120 and the baseplate 10. When the keyswitch 12 is pressed, the key cap 120 will move toward the baseplate 10 along with the lift support device 122. The resilient member 124 is used to provide elastic force while the key cap 120 moves upward and downward with respect to the baseplate 10. The resilient member 124 may be, but not limited to, a rubber dome. The circuit board 16 has a switch corresponding to the keyswitch 12, wherein the switch may be a membrane switch or other trigger-type switch. When the key cap 120 is pressed, the resilient member 124 triggers the switch of the circuit board 16, so as to execute desired function correspondingly.

As shown in FIG. 2, the backlight module 14 comprises a light guide plate 140, a light source 142, a light shielding sheet 144, a light reflecting sheet 146 and a light shielding member 148. The light source 142 is disposed neighboring to the light guide plate 140 and used for emitting light into the light guide plate 140, such that the light is guided by and emitted out of the light guide plate 140, so as to be served as a light source for the keyboard 1. In practical applications, the light source 142 may be a light emitting diode. The light shielding sheet 144 is disposed on the light guide plate 140 and the light reflecting sheet 146 is disposed below the light guide plate 140.

In this embodiment, the light guide plate 140 has a hole 1400 formed thereon and the hole 1400 is used for accommodating a pointing stick, a fastening member or the like. The hole 1400 has a side wall 1402. The light shielding member 148 is disposed in the hole 1400 and covers the side wall 1402 of the hole 1400, so as to block the light guided by the light guide plate 140 from being emitted out of the hole 1400. Accordingly, the light emitted by the light source 142 will not leak from the hole 1400 of the light guide plate 140, so as to prevent a light leak phenomenon.

Figure 3:
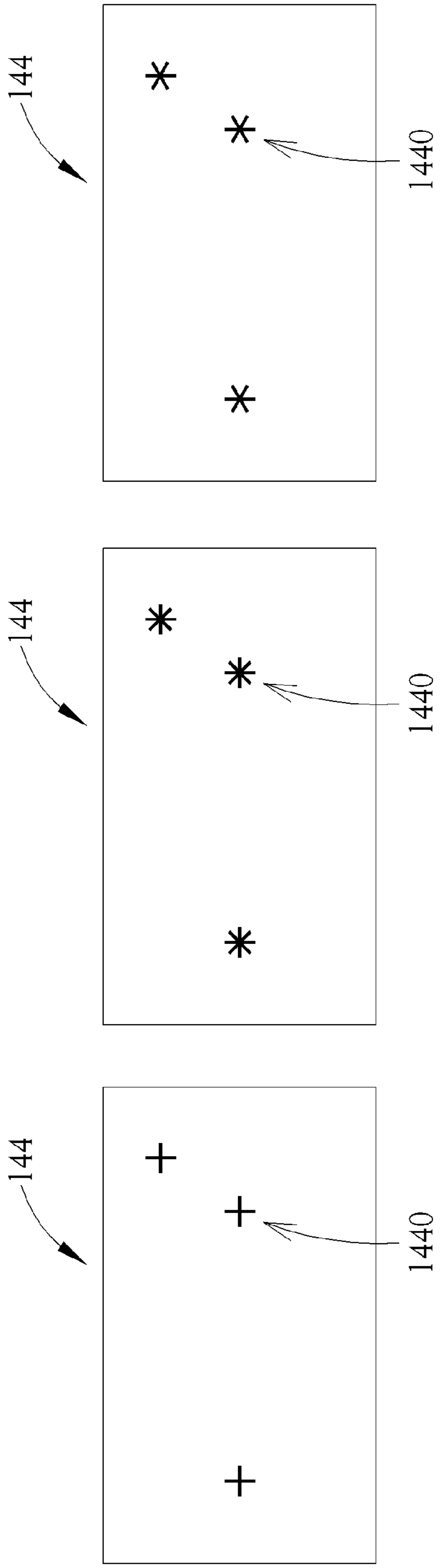
FIG. 3 is a top view illustrating the light shielding sheet shown in FIG. 2 with three types of breaches.

Referring to FIG. 3, FIG. 3 is a top view illustrating the light shielding sheet 144 shown in FIG. 2 with three types of breaches 1440. As shown in FIG. 3, the light shielding sheet 144 of the invention may have a breach 1440 formed thereon and a shape of the breach 1440 may be one selected from a group consisting of a crisscross shape, an octagonal shape and a radiate shape according to practical applications. Furthermore, the position of the breach 1440 is corresponding to the hole 1400 of the light guide plate 140. To assemble the keyboard 1, the light shielding sheet 144 and the light reflecting sheet 146 are disposed at opposite sides of the light guide plate 140 first, and the breach 1440 of the light shielding sheet 144 and a hole 1460 of the light reflecting sheet 146 are aligned with the hole 1400 of the light guide plate 140. Afterward, a fastening member 100 of the baseplate 10 is inserted into the breach 1440, the hole 1400 and the hole 1460 downwardly. When the fastening member 100 passes through the breach 1440 and the hole 1400 downwardly, the fastening member 100 pushes portions of the light shielding sheet 144 around the breach 1440 into the hole 1400 downwardly, so as to form the aforesaid light shielding member 148, as shown in FIG. 2. Since the shape of the breach 1440 is one selected from the group consisting of a crisscross shape, an octagonal shape and a radiate shape, the portions of the light shielding sheet 144 can be distributed on the side wall 1402 of the hole 1400 substantially symmetrically after the portions of the light shielding sheet 144 are pushed into the hole 1400. Accordingly, the light emitted by the light source 142 will not leak from the hole 1400 of the light guide plate 140, so as to prevent the light leak phenomenon. It should be noted that the breach 1440 is formed by a plurality of cuts and looks like a flat surface with the cuts before the portions of the light shielding sheet 144 are pushed into the hole 1400 by the fastening member 100.

Figure 4:
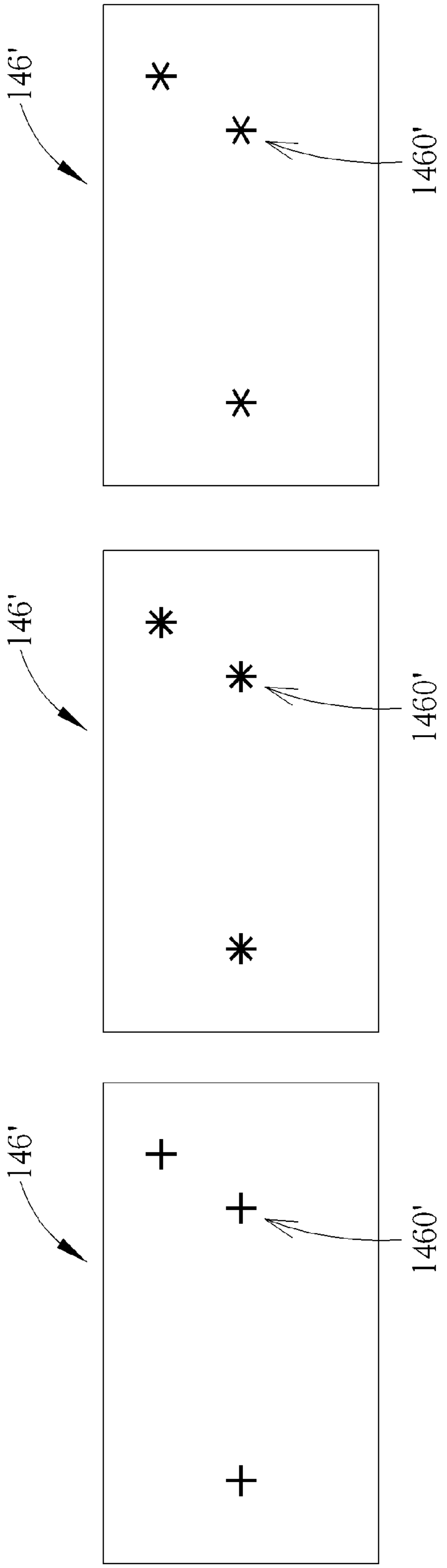
FIG. 4 is a top view illustrating a light reflecting sheet with three types of breaches according to another embodiment of the invention.
Figure 5:
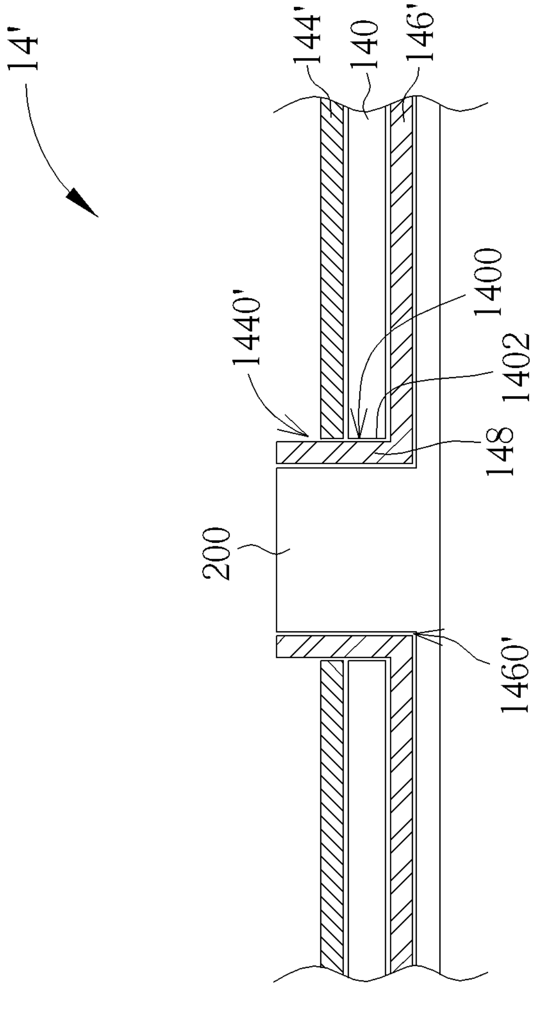
FIG. 5 is a cross-sectional view illustrating a backlight module equipped with the light reflecting sheet shown in FIG. 4.
Figure 6:
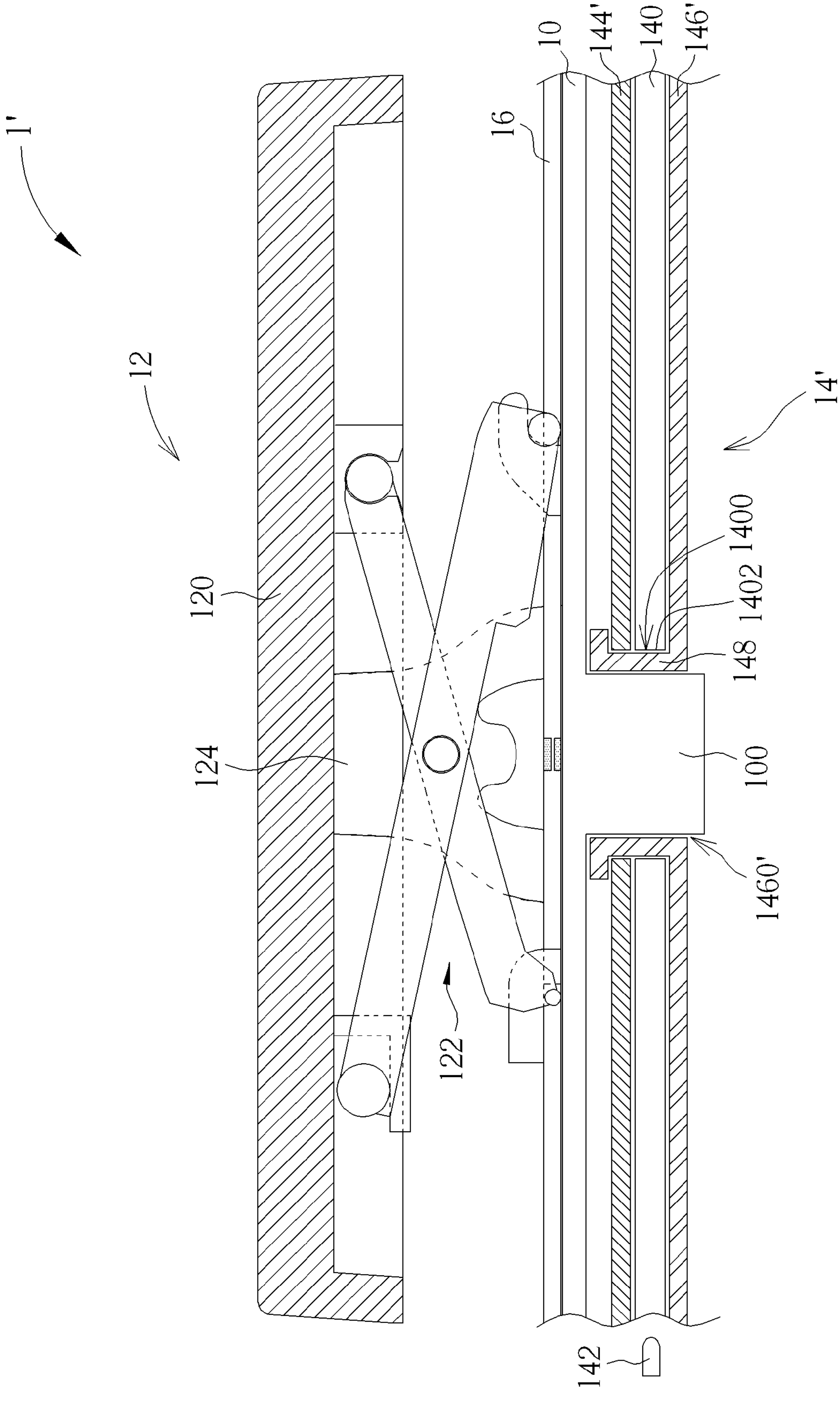
FIG. 6 is a cross-sectional view illustrating a keyboard equipped with the backlight module shown in FIG. 5.

Referring to FIGS. 4 to 6, FIG. 4 is a top view illustrating a light reflecting sheet 146' with three types of breaches 1460' according to another embodiment of the invention, FIG. 5 is a cross-sectional view illustrating a backlight module 14' equipped with the light reflecting sheet 146' shown in FIG. 4, and FIG. 6 is a cross-sectional view illustrating a keyboard 1' equipped with the backlight module 14' shown in FIG. 5. As shown in FIG. 4, the light reflecting sheet 146' of the invention may have a breach 1460' formed thereon and a shape of the breach 1460' may be one selected from a group consisting of a crisscross shape, an octagonal shape and a radiate shape according to practical applications. Furthermore, the position of the breach 1460' is corresponding to the hole 1400 of the light guide plate 140.

To assemble the backlight module 14', the light shielding sheet 144' and the light reflecting sheet 146' are disposed at opposite sides of the light guide plate 140 first, and a hole 1440' of the light shielding sheet 144' and the breach 1460' of the light reflecting sheet 146' are aligned with the hole 1400 of the light guide plate 140. Afterward, a fastening member 200 of a tool is inserted into the breach 1460', the hole 1400 and the hole 1440' upwardly. When the fastening member 200 of the tool passes through the breach 1460' and the hole 1400 downwardly, the fastening member 200 of the tool pushes portions of the light reflecting sheet 146' around the breach 1460' into the hole 1400 upwardly, so as to form the aforesaid light shielding member 148, as shown in FIG. 5. Since the shape of the breach 1460' is one selected from the group consisting of a crisscross shape, an octagonal shape and a radiate shape, the portions of the light reflecting sheet 146' can be distributed on the side wall 1402 of the hole 1400 substantially symmetrically after the portions of the light reflecting sheet 146' are pushed into the hole 1400. It should be noted that the breach 1460' is formed by a plurality of cuts and looks like a flat surface with the cuts before the portions of the light reflecting sheet 146' are pushed into the hole 1400 by the fastening member 200.

Then, another tool (not shown) may be used to press down the light shielding member 148, which protrudes from the hole 1440', onto the light shielding sheet 144', such that an upper end of the light shielding member 148 is extended out of the hole 1400 and covers an edge of the light shielding sheet 144'. Accordingly, the invention can prevent the portions of the light reflecting sheet 146' in the hole 1400 from loosing after removing the fastening member 200 of the tool. Therefore, the light emitted by the light source 142 will not leak from the hole 1400 of the light guide plate 140, so as to prevent the light leak phenomenon. Then, the fastening member 100 of the baseplate 10 can be inserted into the hole 1440', the hole 1400 and the breach 1460' downwardly, so as to finish assembling the keyboard 1', as shown in FIG. 6. It should be noted that the same elements in FIG. 6 and FIG. 2 are represented by the same numerals, so the repeated explanation will not be depicted herein again.

Figure 7:
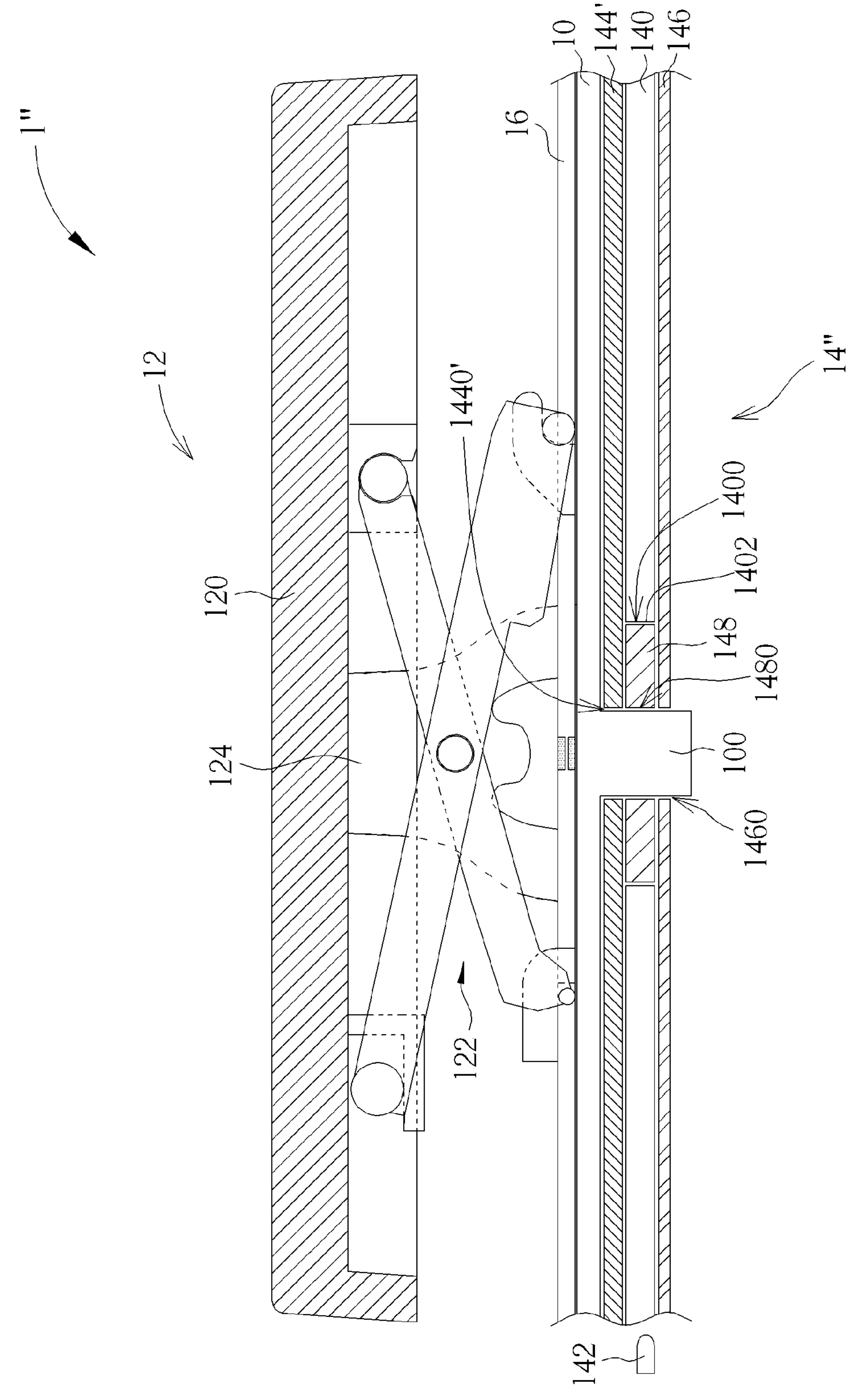
FIG. 7 is a cross-sectional view illustrating a keyboard according to another embodiment of the invention.

Referring to FIG. 7, FIG. 7 is a cross-sectional view illustrating a keyboard 1" according to another embodiment of the invention. The main difference between the keyboard 1" and the aforesaid keyboard 1 is that the light shielding member 148 of the backlight module 14" of the keyboard 1" is an opaque washer (e.g. black washer) and a thickness of the light shielding member 148 is substantially equal to a thickness of the light guide plate 140. To assembly the keyboard 1", the light shielding member 148 is disposed in the hole 1400 of the light guide plate 140 first. Since the thickness of the light shielding member 148 is substantially equal to the thickness of the light guide plate 140, the light emitted by the light source 142 will not leak from the hole 1400 of the light guide plate 140, so as to prevent the light leak phenomenon. Afterward, the light shielding sheet 144' and the light reflecting sheet 146 are disposed at opposite sides of the light guide plate 140, and the hole 1440' of the light shielding sheet 144' and the hole 1460 of the light reflecting sheet 146 are aligned with a hole 1480 of the light shielding member 148. Afterward, the fastening member 100 of the baseplate 10 is inserted into the hole 1440', the hole 1480 and the hole 1460 downwardly, so as to finish assembling the keyboard 1", as shown in FIG. 7. It should be noted that the same elements in FIG. 7 and FIG. 2 are represented by the same numerals, so the repeated explanation will not be depicted herein again.

Compared with the prior art, the backlight module of the invention utilizes the light shielding member, which is disposed in the hole, to block the light guided by the light guide plate from being emitted out of the hole, so as to prevent the light leak phenomenon. The light shielding member may be portions of the light shielding sheet, portions of the light reflecting sheet, or an individual opaque washer according to practical applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module comprising:

a light guide plate having a hole formed thereon, the hole having a side wall;

a light source disposed neighboring to the light guide plate and used for emitting light into the light guide plate;

a light shielding sheet disposed above the light guide plate;

a light reflecting sheet disposed below the light guide plate; and a light shielding member disposed in the hole and covering the side wall, so as to block the light guided by the light guide plate from being emitted out of the hole;

wherein the light shielding sheet has a breach formed thereon and the breach is corresponding to the hole; when a fastening member passes through the breach and the hole downwardly, the fastening member pushes portions of the light shielding sheet around the breach into the hole, so as to form the light shielding member.

2. The backlight module of claim 1, wherein a shape of the breach is one selected from a group consisting of a crisscross shape, an octagonal shape and a radiate shape, such that the portions of the light shielding sheet are distributed on the side wall substantially symmetrically after the portions of the light shielding sheet are pushed into the hole.

3. A keyboard comprising:

a baseplate;

a plurality of keyswitches disposed on the baseplate; and a backlight module disposed below the baseplate, the backlight module comprising:

a light guide plate having a hole formed thereon, the hole having a side wall;

a light source disposed neighboring to the light guide plate and used for emitting light into the light guide plate;

a light shielding sheet disposed above the light guide plate;

a light reflecting sheet disposed below the light guide plate; and a light shielding member disposed in the hole and covering the side wall, so as to block the light guided by the light guide plate from being emitted out of the hole;

wherein the light shielding sheet has a breach formed thereon and the breach is corresponding to the hole; when a fastening member passes through the breach and the hole downwardly, the fastening member pushes portions of the light shielding sheet around the breach into the hole, so as to form the light shielding member.

4. The keyboard of claim 3, wherein a shape of the breach is one selected from a group consisting of a crisscross shape, an octagonal shape and a radiate shape, such that the portions of the light shielding sheet are distributed on the side wall substantially symmetrically after the portions of the light shielding sheet are pushed into the hole.

5. The keyboard of claim 3, wherein the fastening member is downward extended from the baseplate.

6. A backlight module comprising:

a light guide plate having a hole formed thereon, the hole having a side wall;

a light source disposed neighboring to the light guide plate and used for emitting light into the light guide plate;

a light reflecting sheet disposed below the light guide plate; and a light shielding member disposed in the hole and covering the side wall, so as to block the light guided by the light guide plate from being emitted out of the hole;

wherein the light reflecting sheet has a breach formed thereon and the breach is corresponding to the hole; when a fastening member passes through the breach and the hole upwardly, the fastening member pushes portions of the light reflecting sheet around the breach into the hole upwardly, so as to form the light shielding member.

7. The backlight module of claim 6, wherein a shape of the breach is one selected from a group consisting of a crisscross shape, an octagonal shape and a radiate shape, such that the portions of the light reflecting sheet are distributed on the side wall substantially symmetrically after the portions of the light reflecting sheet are pushed into the hole.

8. The backlight module of claim 6, further comprising a light shielding sheet disposed above the light guide plate, so that the light shielding sheet and the light reflecting sheet are disposed at opposite sides of the light guide plate.

9. The backlight module of claim 8, wherein an upper end of the light shielding member is extended out of the hole and covers an edge of the light shielding sheet.

10. A backlight module comprising:

a light guide plate having a hole formed thereon, the hole having a side wall;

a light source disposed neighboring to the light guide plate and used for emitting light into the light guide plate;

a light shielding sheet disposed above the light guide plate;

a light reflecting sheet disposed below the light guide plate; and a light shielding member disposed in the hole and covering the side wall, so as to block the light guided by the light guide plate from being emitted out of the hole;

wherein an upper end of the light shielding member is extended out of the hole and covers an edge of the light shielding sheet.

11. A keyboard comprising:

a baseplate;

a plurality of keyswitches disposed on the baseplate; and a backlight module disposed below the baseplate, the backlight module comprising:

a light guide plate having a hole formed thereon, the hole having a side wall;

a light source disposed neighboring to the light guide plate and used for emitting light into the light guide plate;

a light reflecting sheet disposed below the light guide plate; and a light shielding member disposed in the hole and covering the side wall, so as to block the light guided by the light guide plate from being emitted out of the hole;

wherein the light reflecting sheet has a breach formed thereon and the breach is corresponding to the hole; when a first fastening member passes through the breach and the hole upwardly, the first fastening member pushes portions of the light reflecting sheet around the breach into the hole, so as to form the light shielding member.

12. The keyboard of claim 11, wherein a shape of the breach is one selected from a group consisting of a crisscross shape, an octagonal shape and a radiate shape, such that the portions of the light reflecting sheet are distributed on the side wall substantially symmetrically after the portions of the light reflecting sheet are pushed into the hole.

13. The backlight module of claim 11, wherein the keyboard further comprising a light shielding sheet disposed above the light guide plate, so that the light shielding sheet and the light reflecting sheet are disposed at opposite sides of the light guide plate.

14. The keyboard of claim 13, wherein an upper end of the light shielding member is extended out of the hole and covers an edge of the light shielding sheet.

15. The keyboard of claim 11, further comparing a second fastening member downward extended from the baseplate, wherein after the first fastening member is removed out of the breach and the hole, the second fastening member is inserted into the breach and the hole downwardly.

16. A keyboard comprising:

a baseplate;

a plurality of keyswitches disposed on the baseplate; and a backlight module disposed below the baseplate, the backlight module comprising:

a light guide plate having a hole formed thereon, the hole having a side wall;

a light source disposed neighboring to the light guide plate and used for emitting light into the light guide plate;

a light shielding sheet disposed above the light guide plate;

a light reflecting sheet disposed below the light guide plate; and a light shielding member disposed in the hole and covering the side wall, so as to block the light guided by the light guide plate from being emitted out of the hole;

wherein an upper end of the light shielding member is extended out of the hole and covers an edge of the light shielding sheet.

* * * * *